United States Patent

Hintz

[15] 3,669,923

[45] June 13, 1972

[54] SELF-EXTINGUISHING THERMOPLASTIC MOLDING COMPOSITIONS

[72] Inventor: Hans Hintz, Ludwigshafen(Rhine), Germany

[73] Assignee: Badische Anilin- & Soda-Fabrik Aktiengesellschaft, Ludwigshafen, Rhine, Germany

[22] Filed: Oct. 26, 1970

[21] Appl. No.: 84,178

Related U.S. Application Data

[63] Continuation of Ser. No. 643,821, June 6, 1967, abandoned.

[30] Foreign Application Priority Data

June 23, 1966 Germany..................P 16 69 652.9

[52] U.S. Cl. ..................260/41 C, 260/28.5 A, 260/45.7 R, 260/45.75 R
[51] Int. Cl.......................................C08f 45/14, C08f 45/62
[58] Field of Search...............106/15 FP; 260/DIG. 24, 41 C, 260/28.5 A, 45.75

[56] References Cited

UNITED STATES PATENTS

| | | | |
|---|---|---|---|
| 3,321,416 | 5/1967 | Rauschenbach | 260/45.75 |
| 3,326,832 | 6/1967 | Rauschenbach | 260/45.75 |
| 3,412,052 | 11/1968 | Taylor | 106/15 FP |
| 3,468,678 | 9/1969 | Clampitt | 106/15 FP |

OTHER PUBLICATIONS

Encyclopedia of Polymer Science and Technology, Vol. 7, pages 16 and 20, John Wiley & Sons, 1967.
W. G. Schmidt, " Flame–Retardant Additives in Plastics and Recent Related Patents," Trans. J. Plastics Inst., Dec. 1965, pages 247– 249.
Modern Plastics Encyclopedia for 1965, page 421

*Primary Examiner*—Morris Liebman
*Assistant Examiner*—P. R. Michl
*Attorney*—Johnston, Root, O'Keeffe, Keil, Thompson & Shurtleff

[57] ABSTRACT

Thermoplastic molding compositions containing a styrene polymer and, as flame retardants, an organic chlorine compound, an organic bromine compound and an iron complex of a nitrosonaphthol dye.

10 Claims, No Drawings

SELF-EXTINGUISHING THERMOPLASTIC MOLDING COMPOSITIONS

This is a continuation of Ser. No. 643,821, filed June 6, 1967 and now abandoned.

This invention relates to self-extinguishing thermoplastic molding compositions.

It is known that substances containing halogen, particularly bromine, may be used as flame retardants for thermoplastic polymers. To achieve adequate flame retardance it is necessary to add to the polymers relatively large amounts of halogen-containing substances. As a result, some of the properties of the polymers are determentally affected.

It is also known that the flame retardant effect of bromine-containing compounds can be intensified by additives so that adequate flame retardance can be achieved with a much smaller amount of bromine-containing compounds. Thus for example it is possible to improve the flame retardant effect of organic bromine compounds by adding organic peroxides. Organic peroxides have the disadvantage however that they are toxic and sometimes readily decompose explosively. Susceptible personnel may contract dermatosis when handling such peroxides. Moreover it is necessary to take elaborate and expensive precautions to avoid explosions. Furthermore peroxides slowly decompose even at room temperature so that products which have been stored for a long time are no longer self-extinguishing.

It is also known that chlorinated hydrocarbons may be used together with antimony trioxide as flame retardants for thermoplastic polymers. The disadvantage of this is that a relatively large amount of antimony trioxide is required, by which the mechanical properties are detrimentally affected. This substance cannot be added to the monomers in certain methods of polymerization, for example bead polymerization, because it is not homogeneously distributed in the bead polymer.

Furthermore, for the production of self-extinguishing moldings plastics compositions have been proposed which, in addition to styrene polymers, contain organic chlorine compounds, small amounts of certain organometallic compounds of metals of subgroups 6 to 8 of the Periodic System, such as ferrocene, the corresponding cobalt or manganese compounds, or iron carbonyl, cobalt carbonyl or molybdenum carbonyl. The organometallic compounds have a synergistic effect on the organic chlorine compounds so that considerably smaller amounts of chlorine compounds are required to make styrene polymers self-extinguishing.

It is disadvantageous that the plastics compositions which contain ferrocene complex compounds or similar compounds are discolored. The discoloration moreover changes in the course of time because these compounds are oxidatively degraded under the influence of atmospheric oxygen.

Such discoloration is particularly inconvenient in the case of colored plastics compositions because the original shade of color gradually changes.

It is an object of the invention to provide self-extinguishing thermoplastic molding compositions which contain a styrene polymer and only a small amount of flame retardant. Another object of the invention is to provide self-extinguishing thermoplastic molding compositions which contain a styrene polymer, a flame retardant and an expanding agent. Yet another object of the invention is to provide self-extinguishing thermoplastic molding compositions which contain a styrene polymer and which are not detrimentally affected by the flame retardants. A further object of the invention is to provide self-extinguishing thermoplastic molding compositions which contain a styrene polymer and whose softening points differ only insignificantly from the softening points of those molding compositions which have not been made self-extinguishing. Other objects of the invention will be evident to those skilled in the art from the following description.

These objects are achieved by thermoplastic molding compositions which contain a styrene polymer and, as flame retardants, an organic bromine compound, an organic chlorine compound and an iron complex of a nitrosonaphthol dye (C.I. No. 10,006).

The thermoplastic molding compositions have particularly advantageous properties when the bromine content is 0.05 to 1.0 percent by weight, the chlorine content is 0.5 to 3.0 percent by weight and the content of the iron complex of a nitrosonaphthol dye (C.I. No. 10,006) is 0.01 to 0.5 percent by weight, with reference to the molding composition.

This synergistic combination of flame retardants makes it possible to use considerably smaller amounts of flame retardants than is possible for example when using a bromine compound with a metal-containing dye or when using a chlorine compound with a metal-containing dye. This has the special advantage that thermoplastic molding compositions which have been made flame retardant are practically not different in properties from those which have not been made flame retardant.

The term "styrene polymer" for the purposes of the present invention means a normally solid polymer of unsubstituted styrene or a substituted styrene having the formula:

wherein Ar denotes an aromatic hydrocarbon radical. Examples of substituted styrenes are vinyltoluene, vinylxylene, ar-isopropenylstyrene, ar-tert-butylstyrene and α-methylstyrene and mixtures of these monomers with one another and/or with styrene. Styrene is preferably used.

The styrene polymer comprises in chemically combined form at least 50 percent and preferably at least 70 percent by weight of one of the styrenes. The term "styrene polymer" includes well-known addition copolymers of styrene or substitute styrene with less than 50 percent and preferably less than 30 percent by weight of at least one other readily polymerizable olefinically unsaturated compound having the group

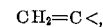

such as α-methylstyrene, nuclear chlorinated styrene, methacrylonitrile, acrylonitrile, esters of acrylic and methacrylic acid and alkanols having one to eight carbon atoms, vinylpyridine, N-vinylcarbazole and butadiene. Examples of suitable copolymers are copolymers of 70 to 80 percent by weight of styrene and 20 to 30 percent by weight of acrylonitrile, 70 to 80 percent by weight of styrene and 20 to 30% by weight of -methylstyrene, 75 to 85 percent of styrene and 75 to 25 percent by weight of methylmethacrylate, 90 to 95 percent by weight of vinyltoluene and 5 to 10 percent by weight of vinylpyridine. Copolymers of styrene, which contain in chemically combined form 0.001 to 1.0 percent and preferably 0.01 to 0.1 percent by weight of units of divinyl compounds such as divinylbenzene or butanedioldiacrylate can also be used in this process according to this invention.

The molding compositions for the production of foam structures may also contain impact-resistant styrene polymers. These include for example mixtures which are obtained by polymerizing styrene, if desired with other monomers, in the presence of finely divided elastomeric polymers. Such polymers may also be prepared by mixing styrene/acrylonitrile copolymers with butadiene polymers or acrylic ester polymers.

Suitable organic chlorine compounds include those which have a high melting point and whose chlorine content is from 40 to 75 percent, such as low molecular weight chlorine compounds, for example hexachlorocyclododecane, hexachlorocyclopentadiene, hexachloroendomethylenetetrahydrophthalic acid, tetrachlorobutyrolactone, tetrachlorobutanediol diacetate. High molecular weight chlorine compounds which have little or no effect on the properties of the styrene polymers are particularly suitable. Examples of these compounds are after-chlorinated polyvinyl chloride having a chlorine content of about 58 to 63 percent by weight and chlorinated polyisobutylene having a chlorine content about 40 to 50 percent by weight. Chlorinated paraffins having a chlorine content of 60 to 75 percent by weight and whose carbon chain contains at least eighteen up to forty carbon atoms are particularly suitable. In any case it is advantageous to use chlorine compounds having a high chlorine content so that their amount in the plastics composition may be kept as small as possible. The chlorine compounds are added to the plastics compositions in such amounts that the chlorine content of the latter is at least 0.5 percent by weight.

Examples of suitable organic bromine compounds are particularly those having a bromine content of more than 30 percent by weight, for example tetrabromobutane, dibromoethylbenzene, dibromopropanol, or esters or acetals of dibromopropanol, for example tris- (dibromopropyl) phosphate, and also pentabromodiphenyl ether. Organic bromine compounds of low volatility which have little or no plasticizing effect and which have no objectionable odor are particularly suitable. These include the bromination products of butadiene oligomers, butadiene polymers, isoprene oligomers or isoprene polymers, for example hexabromocyclododecane, octabromohexadecane, or brominated natural rubber or synthetic rubber. The organic bromine compounds should be used in such amounts that the bromine content of the compositions is at least 0.05 percent by weight.

Plastics compositions which are suitable for the production of colored self-extinguishing expanded moldings are of particular importance. They contain a styrene polymer, an expanding agent, an organic chlorine compound, a bromine compound and an organic metal-containing dye. Expanding agents are hydrocarbons or halohydrocarbons which are gaseous or liquid under standard conditions and which do not dissolve the plastic. Examples of suitable expanding agents are: propane, butane, pentane, hexane or dichlorodifluoromethane. Substances which evolve gaseous substances at a given temperature are also suitable. Azodiisobutyronitrile is an example of such a substance.

The expanding agent may be contained in the expandable plastics composition in an amount of 2 to 20 percent by weight with reference to the polymer contained in the plastics composition. Colored self-extinguishing expanded plastics moldings are obtained from such expandable plastics compositions when fine particles of the compositions are heated in gas-permeable molds to temperatures above the softening point of the polymers contained in the compositions so that the particles expand and fuse together. The expandable plastics compositions may also be processed by means of extruders into expanded plastics moldings (for example expanded plastics sheeting).

The plastics compositions may contain further components, for example fillers, lubricants, antistatics and plasticizers.

To prepare the plastics compositions, the iron complex of a nitrosonaphthol dye, the organic chlorine compound and the bromine compound, either together or singly in succession, may be mixed with the styrene polymer and any other components used. They may be introduced into the plastic for example on rollers, in an extruder or in a kneader. In many cases they may be added to the monomers prior to polymerization. It is also possible, for example in the production of films or sheeting, to add the metal-containing dye together with the chlorine compound and the bromine compound to a solution of the plastic so that they remain in the plastic after the solvent has been removed.

Since many organic metal complex dyes will dissolve in styrene but not in water, it is most advantageous in the special case of colored self-extinguishing and expandable granular molding compositions containing an expanding agent, to convert mixtures of monomers, expanding agents, chlorine compounds, bromine compounds and iron complexes of nitrosonaphthol dyes in aqueous suspension into colored self-extinguishing and expandable granular compositions.

The plastics compositions may be processed for example by injection molding or extrusion into self-extinguishing moldings or sections. Solutions of the plastics compositions in organic solvents are suitable as self-extinguishing lacquers, for example for painting wood or metal. Owing to their relatively low content of organic halogen compounds, the molding materials according to this invention have softening points which differ only insignificantly from those of the polymers contained therein.

The molding compositions are also distinguished by the fact that they retain the flame retardant characteristics and do not discolor after prolonged storage so that they retain their original shade of color.

The flame retardance of the molding compositions is tested as follows. An expanded plastics molding is held for five seconds in the non-luminous flame of a bunsen burner and then removed from the flame with a gentle movement. The time which elapses after removal from the flame until the molding ceases to burn is a measure of the self-extinguishing property. Molding materials which are not self-extinguishing or inadequately so will burn away completely after they have been removed from the flame.

The invention is further illustrated by the following Examples in which parts are by weight.

EXAMPLE 1

In each case 100 parts of a styrene polymer which contains 5 percent by weight of pentane in fine distribution and certain amounts of hexabromocyclododecane (HBC), chloroparaffin containing 70 percent of chlorine (CP) and an iron complex of a nitrosonaphthol dye (C.I. No. 10,006) (ICND) as set out in the following Table are intimately mixed and plasticized in an extruder at temperatures of 100° to 150° C. The thermoplastic compositions are then extruded through a flat sheeting die into sheeting having a thickness of 0.2 to 0.5 cm. The sheeting obtained is expanded in steam at 100° C. and dried in vacuo at 50° C. for a period of 12 hours. The expanded plastics sheeting obtained is tested as to its burning behavior by the method described above. The extinction time (ET) is given in seconds in the table.

| ICND % | HBC % | CP % | ET |
| --- | --- | --- | --- |
| 0.1 | 0.5 | 1.75 | 0.5 |
| 0.1 | 0.1 | 2.0 | 1.8 |
| 0.05 | 0.25 | 2.0 | 1.0 |

In comparative experiments using only one halogen compound, the following values are obtained:

| ICND % | HBC % | CP % | ET |
| --- | --- | --- | --- |
| 0.1 | 0.5 | – | more than 30 (burns) |
| 0.1 | 1.5 | – | 10.0 |
| 0.1 | – | 2.0 | more than 30 (burns) |
| 0.1 | – | 7.5 | more than 30 (burns) |

EXAMPLE 2

100 parts of polystyrene, 1.75 parts of chloroparaffin (70 percent of chlorine), 0.25 part of hexabromocyclododecane and 0.1 part of an iron complex of a nitrosonaphthol dye (C.I. No. 10,006) and 1 percent of a conventional nucleating agent (finely divided silicate) are mixed in a double-screw extruder at temperatures of from 180° to 200° C. 10 parts of methyl chloride is added to this mixture in the middle section of the extruder. The expandable composition obtained is extruded through a flat sheeting die to form an expanded plastics board having a density of 35 g/l.

Samples are stored for four weeks and then tested by the above method. The extinction time of the samples tested is less than 1 second.

I claim:

1. A self-extinguishing thermoplastic molding composition comprising a vinyl monoaromatic polymer containing at least 50 percent by weight of vinyl monoaromatic monomers polymerized therein, an organic chlorine compound having a high melting point and a chlorine content of 40–75 percent in an amount of said compound sufficient to provide a chlorine content in said molding composition of at least 0.5% by weight, a bromination product of butadiene oligomers, butadiene polymers, isoprene oligomers or isoprene polymers with a bromine content of more than 30 percent by weight in an amount sufficient to provide a bromine content in said molding composition of at least 0.05 percent by weight, and 0.05 to 0.5 percent by weight, with reference to said composition, or an iron complex of 1-nitroso-2-naphthol (C.I. 10 006).

2. A molding composition as claimed in claim 1 wherein said amount of said organic chlorine compound provides a chlorine content in said composition of 0.5 to 3 percent by weight and said amount of said brominated product provides a bromine content in said composition of 0.05 to 1.0 percent by weight.

3. A molding composition as claimed in claim 2, said organic chlorine compound being hexachlorocyclododecane, hexachlorocyclopentadiene, hexachloroendomethylenetetrahydrophthalic acid, tetrachlorobutyrolactone, tetrachlorobutanediol diacetate, after-chlorinated polyvinyl chloride, chlorinated polyisobutylene, or a chlorinated paraffin having 18–40 carbon atoms.

4. A molding composition as claimed in claim 3 wherein said styrene polymer contains (a) at least 50 percent by weight of styrene, vinyltoluene, vinylxylene, ar-isopropenylstyrene, ar-tert-butylstyrene or α-methylstyrene with (b) the remainder, if any, being α-methylstyrene, nuclear chlorinated styrene, methacrylonitrile, acrylonitrile, an ester of acrylic or methacrylic acid and an alkanol having one to eight carbon atoms, vinylpyridine, N-vinylcarbazole or butadiene or 0.001 to 1 percent of divinylbenzene or butanediolacrylate.

5. A molding composition as claimed in claim 2 wherein said styrene polymer contains (a) at least 50 percent by weight of styrene, vinyltoluene, vinylxylene, ar-isopropenylstyrene, ar-tert-butylstyrene or α-methylstyrene with (b) the remainder, if any, being α-methylstyrene, nuclear chlorinated styrene, methacrylonitrile, acrylonitrile, an ester of acrylic or methacrylic acid and an alkanol having one to eight carbon atoms, vinylpyridine, N-vinylcarbazole or butadiene or 0.001 to 1 percent of divinylbenzene or butanediolacrylate.

6. A molding composition as claimed in claim 3 wherein said styrene polymer is a homopolymer of styrene.

7. A molding composition as claimed in claim 2 wherein said styrene polymer is a homopolymer of styrene.

8. A molding composition as claimed in claim 3 wherein said composition further contains 2–20 percent by weight, based on said styrene polymer, of a normally gaseous or normally liquid expanding agent or an expanding agent which decomposes into a gas at a given temperature.

9. A molding composition as claimed in claim 1 wherein said styrene polymer is polystyrene and said organic chlorine compound is a chlorinated paraffin having a chlorine content of 60-75 percent by weight and 18–40 carbon atoms.

10. A molding composition as claimed in claim 1 wherein said styrene polymer is polystyrene and said organic chlorine compound is a chlorinated paraffin having a chlorine content of 60–75 percent by weight and 18–40 carbon atoms, and said brominated product is hexabromocyclododecane.

* * * * *